June 5, 1962 F. STERZER 3,038,086

RADIO FREQUENCY LOGIC CIRCUITS

Filed June 27, 1958 2 Sheets-Sheet 1

INVENTOR.
FRED STERZER

BY Milton S. Winters

ATTORNEY

INVENTOR.
FRED STERZER
BY Milton S. Winters
ATTORNEY

United States Patent Office 3,038,086

Patented June 5, 1962

3,038,086

RADIO FREQUENCY LOGIC CIRCUITS

Fred Sterzer, Monmouth, N.J., assignor to Radio Corporation of America, a corporation of Delaware Filed June 27, 1958, Ser. No. 745,220
7 Claims. (Cl. 307—88.5)

The present invention relates to information handling systems, such as electronic computers, and particularly to components of such systems of the type sometimes called "logic" circuits.

It is desirable in information handling systems and computers that the systems operate at a high speed. Accordingly, it is desirable that the various logic circuits be of high speed, both in response and in recovery time. High speed operation involves the transmission and amplification of very short pulses. Such transmission and amplification, in turn, require circuits which pass very large bandwidths. For example, if a computer is to be operated at a pulse rate of 1,000 megacycles per second, then each pulse may be allotted a time interval of about $10^{-9}$ seconds or less. To amplify such pulses, components are required having a bandwidth of at least 2,000 megacycles, so that pulses having a rise time of one-half of a millimicrosecond may be reproduced. Techniques for the amplification of such short pulses, if these are D.-C. (direct current) pulses, are not presently available. However, microwave circuits are available, both for the transmission and amplification of pulses, which have comparable bandwidths. The use of RF (radio frequency) pulses also provides a degree of freedom or manipulation in the use of the phase of the RF.

Therefore, it has been suggested that electronic information handling systems use pulses of RF which occur or are absent in certain time spaces. In such a system, a binary "one" may be encoded as a pulse of RF energy in a time space, and a binary "zero" may be encoded as the absence of a pulse in the time space. The RF pulses may be carried by suitable transmission lines, such as hollow pipe waveguide or two conductor transmission lines, such as coaxial lines or strip line. In practicing the present invention, it is contemplated that the RF carrier of different pulses be phased definitely with respect to that of other RF pulses in the same time space. Observe that the RF pulse carrier further offers a means of providing some delay times in conducting the energy through the system by means of these transmission lines.

It is an object of the present invention to provide high speed logic circuits for a radio frequency carrier system of the type described.

It is another object of the system to provide a high frequency component for a radio frequency carrier information handling system which has a desirably short time of action and a desirably rapid recovery time.

It is another object of the invention to provide, for a radio frequency carrier information handling system of the type mentioned, a rapidly acting "and" circuit.

Another object of the invention is to provide, for a radio frequency carrier system of the type mentioned, a rapidly acting "or" circuit.

The foregoing and other objects, advantages, and novel features of the invention will be more fully apparent from the following description when read in connection with the accompanying drawing, in which like reference numerals refer to like parts, and in which.

According to the invention, a main RF transmission line is supplied with a shunt quarter wavelength (or odd number of quarter wavelengths), branch line terminated with a biased diode. If the diode is biased in the backward direction, the component is a so-called expander. If the diode is biased in the forward direction, the component is a so-called limiter. A basic logic circuit, either an "or" or an "and" circuit, may be constructed by applying two inputs so that the RF energy is applied to the main transmission line of the component in like phase. If the component is an expander, with a back-biased diode shunting the main line, the circuit is an "and" circuit. If the component is a limiter, with a forward-biased diode, the logic circuit is an "or" circuit.

Figures 1, 2, 3, 4, 5:
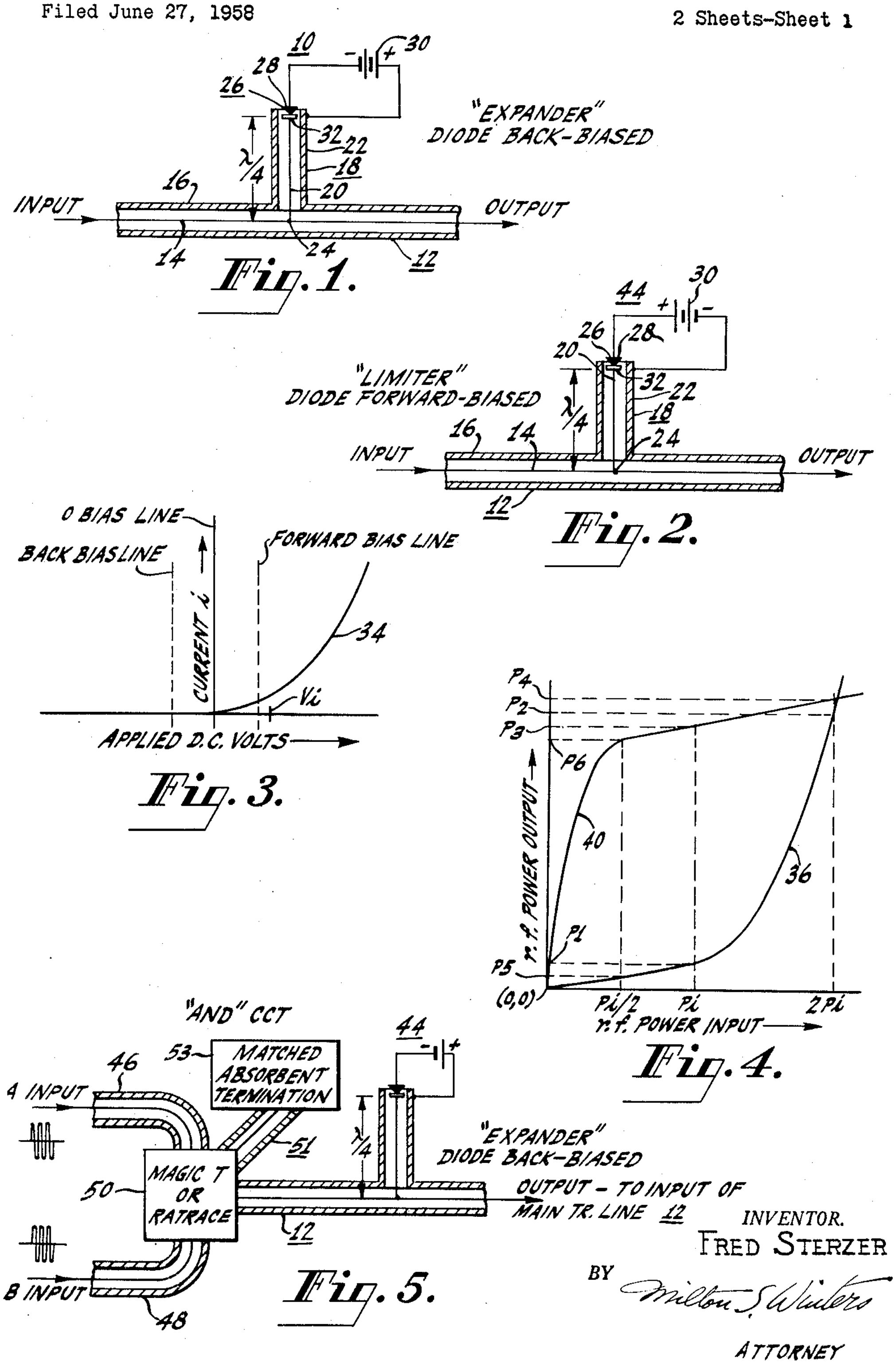
FIGURE 1 is a schematic drawing, partly in cross section, showing a component which is termed herein an "expander"
FIGURE 2 is a schematic drawing, partly in cross-section, illustrating a component termed herein a "limiter"
FIGURES 3 and 4 show graphs useful in explaining the operation of the components of FIGURES 1 and 2.
FIGURE 5 is a schematic cross sectional view showing an "and" circuit according to the invention.

The expander of FIGURE 1 includes a main transmission line 12 in the form of a coaxial line having an inner conductor 14 and an outer conductor 16. A coaxial line section 18 having an inner conductor 20 and an outer conductor 22 has one of its ends connected at a junction 24 to the main transmission line 12. Inner and outer conductors of the section 18 and the main line 12 are respectively connected together at the junction, so that the line section 18 is effectively in shunt with the main line 12. The line section 18 has an effective length of $\lambda/4$ where $\lambda$ is a wavelength in the transmission line at the operating frequency of the RF energy in the system. The line section 18 is terminated at its end remote from the junction 24 by a crystal diode 26. The diode 26 has its anode 28 connected to the negative terminal of a suitable bias voltage source represented schematically by a battery 30. The positive terminal of the source 30 is connected to outer conductor 22 of the coaxial line section 18. The cathode 32 of the diode 26 is connected to the inner conductor 20 of line section 18. In both the expander of FIGURE 1 and the limiter of FIGURE 2, described more fully hereafter, a suitable return path for the D.-C. is provided by any suitable conventional means. For example, such means may take the form of a resistance connected between the inner and outer conductors of a coaxial line portion in the system. In one practical system, the D.-C. return path was provided by the internal impedance of the microwave generator.

The operation of the expander of FIGURE 1 may be explained with reference to the graphs of FIGURES 3 and 4. In FIGURE 3 is shown a somewhat idealized graph of the current flow through the crystal diode 28 plotted against the D.-C. voltage applied thereto. Voltage applied to the diode poled in the back direction, that is, with a polarity tending to cause current flow in the diode in the back direction, causes substantially no current flow through the diode. Voltage applied in this sense is plotted to the left of the zero bias line or axis. Voltage applied to the diode poled in the forward direction is plotted as positive, to the right of the zero bias axis. This voltage, being applied in the direction tending to cause a current flow in the forward direction through the diode, results in a current increasing with increase of applied voltage as indicated by the curve 34.

With reference now to the idealized graph of FIG-

URE 4, RF power input applied to the input of the main transmission line 12 of FIGURE 1 is plotted along the horizontal axis in units of Pi. Power output from the main transmission line 12 is plotted along the vertical axis, although not necessarily in the same units. The curve 36 represents the power output plotted against power input for the expander 10 of FIGURE 1. When the RF power input is low, the amplitude of the RF voltage at the diode 26 is insufficient to drive the diode into conduction. Therefore, the line section 18 is a quarter wavelength line section open circuited at its remote end. The line section therefore appears as a short circuit at the junction 24. Consequently, the RF energy from the input of the main line section 12 is reflected by this apparent short circuit at the junction 24. Thus, there is substantially no power output, or very little power output, from the output of the main transmission line 12. This operation is illustrated by the portion of the curve 36 near the intersection (0,0) of the power input and power output axes in FIGURE 4, through which intersection, of course, the curve 36 passes. When the RF power input reaches a value, for example, Pi, the RF power output may have a value of P1. However, as the power input increases to a value 2 Pi, the diode 26 begins to conduct heavily, and the line section 18 termination appears more nearly matched than before. In an ideal case, the power divides at the junction 24 between the line section 18 and the output of the main transmission line 12. Accordingly, there is a substantial amount of power output P2 corresponding to the power input 2 Pi. In this case, the power output P1 corresponding to the input Pi is small compared to the output P2 corresponding to the input 2 Pi. By small, I mean about 1/10 or less. That is, P1 is about 1/10 of P2 or less.

It is interesting to note that the operation of the expander may be improved by selecting a diode 26 which has a Zener breakdown voltage correlated both with the applied bias and the amplitude of the RF voltage input. Apparently, if the back bias is about midway between the Zener breakdown voltage and zero bias, and the peak to peak RF voltage amplitude, for a wave of power input Pi, is about 1/2 of the Zener breakdown voltage, an improved effect is obtained. This effect is probably due to the diode's being driven into conduction on both swings of the RF voltage when a wave of power amplitude 2 Pi is applied. Whatever the reason, it turns out that judicious selection of a diode with a suitable breakdown voltage aids in the operation.

The arrangement of FIGURE 2 is similar to the arrangement of FIGURE 1, except that the diode 26 is forward biased instead of back biased. In other words, the negative terminal of the battery 30 is connected to the outer conductor 22 of the line section 18. The positive terminal of the battery 30 is connected to the anode 28 of the diode 26. This arrangement, which is termed herein a "limiter" provides outputs which are not greatly different for both high and low RF power to the main transmission line 12.

The operation of the limiter 44 of FIGURE 2 may be explained with reference to the curve 40 of FIGURE 4. Notice that the RF output power increases rapidly with increased power input from zero power at the intersection of the axes. As the RF power input increases to Pi, the power output increases to a value P3. As the RF power input increases from Pi to 2 pi, however, the amplitude of RF power output increases only from P3 to P4, which increase is small compared to P3.

The following qualitative explanation may be offered for the result obtained with the limiter 44 of FIGURE 2 as plotted by the observed curve 40. Starting with no RF power input, there is, of course, no output. The point (0,0) represents this condition. As the RF power input increases, the diode, which is already conducting due to the forward bias, rapidly conducts more heavily. When the RF power input has reached the value Pi, the diode is in substantial conduction, and represents a fairly good match at the end of the λ/4 line section 18 remote from the junction 24. Accordingly, the line section 18 appears as a shunt with about the same impedance as the main line, looking from junction 24 toward the output. As the power input increases still further, from the value Pi to the value 2 Pi, the diode becomes somewhat less matched, and much of the power into the line section 18 is reflected back from its termination. The power output increases very little with increasing power input after a certain point is reached because the effect of the increasing mismatch tends to compensate at the output for the effect of the increasing power input. In other words, observing the curve 40, the power output P3 corresponding to the power input Pi is substantially greater than P1. On the other hand, the power output P2 corresponding to the power input 2 Pi is very little greater than P3. As before, by little greater or by small increase, I mean that the increase is 1/10 or less the compared value.

The expander 10 of FIGURE 1 is used in the arrangement of FIGURE 5 to provide an "and" circuit. An A input and a B input are applied respectively to coaxial transmission lines 46 and 48. The A input to the first transmission line is coded so that a burst of RF energy of power Pi and having a certain time duration, represents a binary one, where as the absense of such a pulse represents a binary zero. The pulse "spaces" occur at predetermined pulse rates. A B input to the second transmission line 48 is coded in a similar manner. The two transmission lines 46 and 48 are joined at a junction 50, which is preferably reflectionless. Matching the inputs to be reflectionless, although half the power is lost between input and output, may be accomplished in known fashion, as my using a magic T, or rat race, or other equivalent, hybrid circuit, for all of which the term hybrid circuit (or hybrid junction) is used herein as a generic term. In FIGURE 5, the hybrid circuit is indicated at the junction 50. The input transmission lines 46 and 48 may be one pair of arms for the magic T which are symmetrical with each other, whereas the main transmission line input 12 and the fourth transmission line 51 may be the other pair of the symmetrical arms of the hybrid junction. The arm 51 is terminated in a matched energy absorbent termination 53. As is known, RF energy applied at A will divide equally between the main transmisison line input 12 and the fourth line 51. Similarly, RF energy applied to transmission line 48 divides in ike manner. However, if RF energy applied to lines 46 and 48 at the same time, arrives at the hybrid junction or rat race 50 in like phase, all of the energy passes into one or the other of the branches 12 or 51. In this instance, the arrangement is such that all the energy passes into the branch 12 under these conditions. The inputs are such that, as a binary pulse of RF power is applied to both the A input and the B input, the power from both arrives at junction 50 in like RF phase relationship, and substantially coincidentally in time. That is, the pulse spaces are substantially identical. Thus, the input to the main transmission line 12 is applied from the junction 50.

In operation, it is obvious that if no energy is applied at the A input and no energy is applied at the B input, then there is no output. If the A input applies energy corresponding to a binary "one" during a pulse space and the B input applies no energy during that pulse space, then substantially half the A energy of power Pi/2 is applied to the transmission line 12. In accordance with the curve 36, which applies with respect to the expander using the back-biased diode, the output appears as a radio frequency energy of power P5, less even than P3. In other words, there is substantially no output from the "and" circuit. Similarly, if there is a B input pulse corresponding to a binary "one," and no A input, the RF energy appearing at the output is very low in amplitude, corresponding to P5 in FIGURE 4. However, if both an A input pulse and a B input pulse are present in the same pulse space, and in phase, the amplitude of the input to the main transmission line 12 is approximately 2 Pi, that is, four times the power applied as a result of any single RF input pulse from the A or B input alone. Accordingly, the output is an RF pulse of amplitude P4, as illustrated in FIGURE 4. It is, therefore, apparent that the circuit of FIGURE 5 operates as an "and" circuit. In practice, the discrimination, that is, the ratio between the "zero" output (corresponding to a single input of power Pi) and the "one" output (when both inputs, each of power Pi, are present in the same pulse space) is very small. As measured in one particular instance, the ratio was 1:10.

Figures 6, 7, 8, 9:
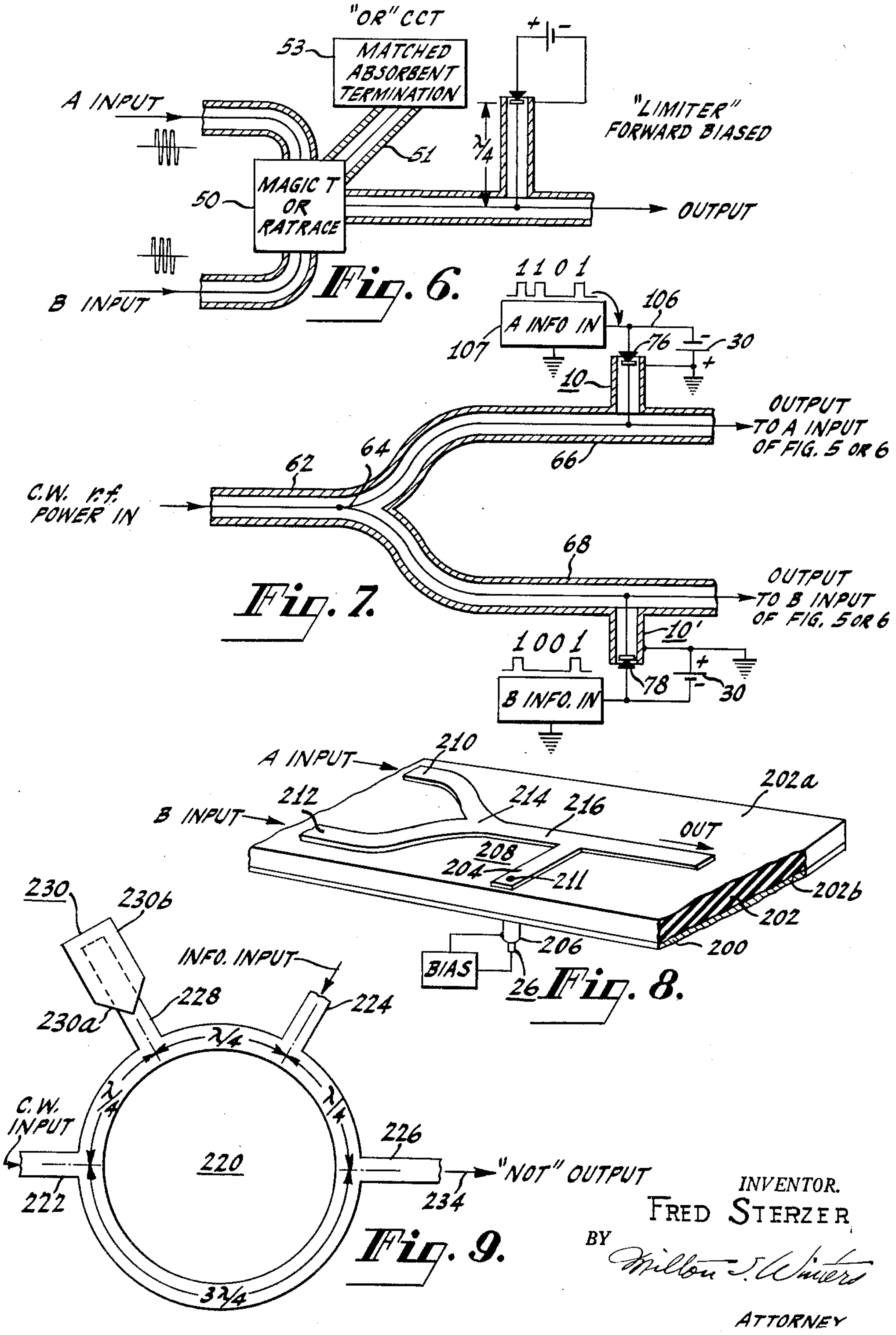
FIGURE 6 is a schematic cross sectional view showing an "or" circuit according to the invention.
FIGURE 7 illustrates a method of deriving information pulses.
FIGURE 8 is a perspective view of a preferred arrangement for providing an "and" or "or" circuit component.
FIGURE 9 is a top view of a "not" circuit useful in a system of the type mentioned.

The forward bias, or limiter, component of FIGURE 2 may be used to provide an "or" circuit. The input arrangement as illustrated in FIGURE 6 may be the same as that provided in FIGURE 5. With no input present in a particular pulse space, the circuit of FIGURE 6 provides no output. If one pulse alone is present, in the arrangement of FIGURE 6 during a particular pulse space, either from the A input or B input, then the output is an RF pulse corresponding to P6 in FIGURE 4, due account being taken of the action of the hybrid junction 50. If both A input and B input pulses are present during a particular pulse space in the arrangement of FIGURE 5, then the output is an RF pulse of power P4 as indicated in FIGURE 4. However, the output of power P4 or P6 is substantially the same, that is, they are within 10% of each other, and each may be considered to represent a binary one.

Accordingly, it is clear that the arrangement of FIGURE 5 has an output related to the two inputs in the same fashion as the truth table which relates the output of an "and" circuit to its inputs. Similarly, the arrangement of FIGURE 6 provides an output related to the two inputs as the truth table for an "or" circuit.

It will be understood that in a system employing components such as disclosed herein, due account must be taken of the delay of the pulses of radio frequency energy in traveling from point to point through the waveguides. Moreover, care must be taken to take account of the RF phase relationship throughout.

The manner in which the RF waves may be modulated to provide the desired information pulses is illustrated in FIGURE 7. In the arrangement of FIGURE 7, a continuous wave (C.W.) microwave generator is used. The waves are applied to a transmission line 62, in this case a coaxial line. At a junction 64 the line 62 branches into two branch lines 66 and 68, the energy dividing equally. It may be assumed that each branch 66 or 68 receives microwave energy with a power of about Pi.

The diodes 76 and 78 terminate quarter wavelength line sections in arrangements similar to that illustrated in FIGURE 1, that is. Thus, the diode 76 is the diode termination of an expander 10 corresponding to that of FIGURE 1 in which the transmission line 66 is the main transmission line. The diode 78 is the diode termination having a line section 16' which is similar to the expander 10 with the transmission line 68 as the main transmission line.

Assume now that an information pulse of RF applied to an input line 106 comes from a source of D.C. information pulses 107. The information pulses are of a polarity (in this case positive) and of an amplitude to overcome the bias voltage applied by the source 30. Such a pulse causes the diode 76 to become forward biased, rather than back biased. With the diode 76 forward biased, the circuit acts like a limiter, and passes to the output pulses of RF power Pi during the application of the pulses from the source 107. However, while the crystal diode 76 is back biased, the RF energy applied at the input of the main transmission line 66 is not passed by the main transmission line 66, but is reflected. In the presence of a pulse from the line 106, the positive-going pulse is sufficient to overcome the back bias in order to cause the diode to appear as a termination substantially different from an open circuit at the quarter wave line section end, and a pulse of RF appears at the output of transmission line 66 to become an A input pulse.

Another way of looking at this operation is to observe that when the D.C. input pulse on line 106 overcomes the back bias, the operation of the line section arrangement changes from that represented by the curve 36 to that represented by the curve 40. Accordingly, it will be clear that information may be applied at will in the form of radio wave pulses of specified time duration.

The RF transmission lines illustrated in FIGURES 1, 2, 5, 6 and 7 have been illustrated as coaxial transmission lines for purposes of explanation primarily. At the operating frequencies here contemplated, these transmission lines may be difficult to match, may be difficult of construction because high tolerances are required at high frequencies, may be difficult to interconnect, and tend to be bulky.

A preferred construction for the components of the invention is to use the so-called strip transmission lines. Such strip lines may be constructed, as illustrated in particular in FIGURE 8, by employing a metal ground plate 200, which may be copper, applied as a backing on one surface **202*b* of a suitable dielectric 202. On the other surface 202*a* of the dielectric 202, are strips of copper, which may be applied by printed circuit techniques, to form the desired transmission line circuit. The transmission line is formed between the strip copper and the spaced ground plate 200. Consider, for example, a strip of copper somewhat less than a quarter wavelength at the RF operating frequency, long deposited on the upper surface 202*a* of the dielectric 202. This near quarter wavelength strip of copper 204 is terminated at one end by a known type of transducer 206 which converts the RF energy. These transducers are known and preferably include an outer conductor connected to the ground plate 200 and an inner conductor which passes through an aperture in the ground plate and is connected to strip 204 at a point 211 near the end of the strip. Suitable impedance matching may be provided. The coaxial line transducer 206 may have a crystal mounting for a crystal diode such as the crystal diode 26. The line section 204 and the transducer 206 to its termination together act as a quarter wavelength line. If the connector or transducer to the crystal diode is of the correct length ($\lambda/4$ effectively) and effectively in parallel with the main strip line, the branch strip may be omitted. The A input and the B input may be applied respectively from coaxial lines by similar transducers, not shown, but without the crystal mountings, to a pair of strips 212 and 210 respectively. These input strips 212 and 210 meet at a junction 214 and join continuously and conductively a main strip 218. The branch strip line, which has already been described, is connected to the main strip line 216**.

An alternative of this section connection for the A and B inputs is to have the strips 210 and 212 extend to the edge of the board 202. The boards may then mate so that the strips 210 and 212 connect respectively to strips forming the outputs of other logic circuits, constructed with other logic components of the kind described herein. Those skilled in the art will understand, from the foregoing, how the transmission lines 62, 66 and 68, and the quarter wavelength components of FIGURE 7 may be constructed of strip transmission lines. The A and B outputs of FIGURE 7 may then be connected, respectively, to the A and B inputs of FIGURE 8.

In operation, the arrangement of FIGURE 8 acts as an "and" circuit if the crystal diode is back-biased, and acts as an "or" circuit if the diode is forward-biased. The strip line provides a highly desirable construction because there is little or no "frequency dispersion," that is, because there is no vaiation in phase velocity with frequency as in hollow pipe waveguide. Also, losses in strip line may be low, and the components may be inexpensive and readily constructed as compared to coaxial lines. Strip lines are readily mass produced by printed circuit techniques or the like. Moreover, different so-called hybrid or rat-race constructions or their equivalents are known in strip line. Hence, it will be apparent to those skilled in these arts that all of the components described may be constructed of strip line, and the manner of construction thereof will also be clear to them from the foregoing.

It is known in the information handling art that a complete computer may be constructed provided "and," "or," and "not" circuits are available. For the sake of completeness, a "not" circuit is illustrated in FIG. 9. A hybrid junction in the form of a rat-race 220 in strip line form has a first input arm 222, an information input arm 224, and an information output arm 226. A second ouput arm 228 is terminated with a matched absorptive termination 230, such as is known to the art, which may be a thin flat piece of dielectric coated on the under side, adjacent to the terminated arm 228, with absorptive material such as graphite. The termination 230 may have a tapered portion 230*a* which is laid over the end part of the arm 228 and a rectangular portion 230*b* into which the tapered portion 230*a* merges. The arms 222, 224, 226 and 228 have, respectively, junctions 222′, 224′, 226′ and 228′ with a circular path 231 which is $3\lambda/2$ in mean circumference.

Electrically, the first input arm junction 222′ is ¾ of a wavelength at the RF operating frequency from the information output arm junction 226′ in one direction around half of the circular path 231 of this form of hybrid junction. Along the other half of the circular path, the absorptively terminated output arm junction 228′ and the information input arm junction 224′ are spaced a quarter wavelength from each other and a quarter wavelength, respectively, from the first input arm junction 222′ and the information output arm junction 226′.

In operation, continuous wave (C.W.) energy from the microwave generator may be applied to the first input arm 222. This energy divides, one-half leaving the hybrid circuit 220 at the information output arm 226 and the other half leaving at the terminated arm 228 from which the latter energy is absorbed in the termination 230, and no energy leaves the hybrid circuit or rat-race 220 at the information ouput arm 224 all because of the properties of the hybrid arrangement.

Suppose, now, that RF energy is applied during a pulse space at the information input arm 224. Assume that the amplitude of the input wave at the information input arm 224 is substantially equal to the amplitude of the C.W. wave at the input arm 222, and that the energy applied to the two input arms 222, 224 arrives in like phase at the junctions 222′ and 224′ of the circular path 231 of the hybrid circuit 220. Then, during the application of this information input RF pulse, there is substantially no output at the arm 226, and the energy from the inputs 222 and 224 is absorbed in the termination 230 of the absorptively terminated arm 228, again because of the known properties of the hybrid circuit 220. In summary, there is substantially no output at the "not" output 234 during the presence of an information input pulse. There is an output at the "not" output 234 in the absence of an information input pulse.

The presence of output RF energy during the time between pulse spaces may be inconvenient. This inconvenience may be overcome by applying at the input 222 an RF pulse during each and every pulse space. Then, with the two pulse inputs properly phased, there is substantially no output at the "not" output 234 during the presence of an information pulse at information input 234; and there is a substantial output at the "not" output 234 during the absence of an information pulse at the information input 234. Therefore, the circuit of FIG. 8 provides the logic of a "not" circuit. The "not" output amplitude may be selected appropriately to conform to other "one" amplitudes of the system by suitable control of the input amplitudes or by amplifying or limiting the "not" output, as desired, preferably preserving any desired phase relationship.

In view of the foregoing description, it is apparent that there are disclosed herein a novel element and novel logic circuits for use in RF computers of the type described which provide very fast action. Note that the units are readily designed and constructed to preserve the desired phase relationship. The invention affords inexpensive and readily constructed components suitable for mass production for use in such high speed computers.

What is claimed is:

1. An "and" circuit comprising, in combination, a main transmission line; a branch transmission line connected to the main transmission line and an odd multiple of a quarter wavelength long at the operating frequency; a diode terminating said branch line; means applying first and second radio frequency pulses of the same frequency to said main line; and means for reverse biasing said diode to an extent such that the coincidence of in phase first and second pulses applied to said main transmission line is required to cause substantial conduction of the diode.

2. An "and" circuit as set forth in claim 1, whereby said means for applying said pulses includes a hybrid junction.

3. An "or" circuit comprising, in combination, a main transmission line; means for applying first and second radio frequency pulses of the same frequency to said main transmission line; a branch transmission line connected to the main transmission line and an odd multiple of quarter wavelengths long at said radio frequency; a diode terminating said branch line; and means for forward biasing said diode to an extent such that a first pulse or a second pulse applied to the main transmission line causes the diode to conduct in an amount such that it substantially matches the impedance of said branch line, and the coincidence of in phase first and second pulses applied to the main line causes the diode to conduct more heavily and to look to the main line like a higher value of impedance.

4. In the combination as set forth in claim 3, said means for applying first and second pulses comprising a hybrid junction.

5. A logic circuit for a radio frequency information handling system comprising, in combination, a main transmission line; means for applying first and second trains of spaced radio frequency pulses of the same frequency to said line, some first and second pulses occurring in the same time spaces and some in different time spaces and the radio frequency component of said first and second pulses being in phase when the pulses occur in the same time spaces; a branch transmission line connected to the main transmission line and effectively an odd number of quarter wave lengths long at said radio frequency; a diode terminating said line; and means for reverse biasing said diode to an extent such that only a first or only a second pulse applied to the main transmission line does not cause substantial conduction of the diode, and first and second pulses in the same time space applied to said main transmission line cause conduction of the diode to an extent such that it substantially matches the branch transmission line.

6. In a circuit as set forth in claim 5, said diode having a breakdown voltage in the reverse direction equal to −V and being reverse biased to a value approximately equal to $$\frac{-V}{2}$$

7. A logic circuit for a radio frequency information handling system comprising, in combination, a main transmission line; means for applying first and second trains of spaced radio frequency pulses of the same frequency to said line, some first and second pulses occurring in the same time spaces and some in different time spaces and the radio frequency component of said first and second pulses being in phase when the pulses occur in the same time spaces; a branch transmission line connected to the main transmission line and effectively an odd number of quarter wave lengths long at said radio frequency; a diode terminating said line; and means for forward biasing said diode to an extent such that it conducts at a level at which the branch line appears to be terminated in an impedance substantially equal to its characteristic impedance when only a first or only a second pulse is received by the main line in a time space, and it conducts at a slightly higher level, thereby slightly mismatching said branch line, when both said first and second pulses are received by the main line in the same time space.

References Cited in the file of this patent

UNITED STATES PATENTS

| | | |
|---|---|---|
| 2,438,367 | Keister | Mar. 23, 1948 |
| 2,576,943 | Jenks | Dec. 4, 1951 |
| 2,593,113 | Cutler | Apr. 15, 1952 |
| 2,605,356 | Ragan | July 29, 1952 |
| 2,618,777 | Ashmead | Nov. 18, 1952 |
| 2,822,541 | Sichak et al. | Feb. 4, 1958 |
| 2,912,581 | DeLange | Nov. 10, 1959 |
| 2,914,671 | DeLange | Nov. 24, 1959 |

FOREIGN PATENTS

| | | |
|---|---|---|
| 131,680 | Australia | Mar. 20, 1946 |